United States Patent
Lieder et al.

(10) Patent No.: US 6,989,679 B2
(45) Date of Patent: Jan. 24, 2006

(54) NON-CONTACT CAPACITIVE SENSOR AND CABLE WITH DUAL LAYER ACTIVE SHIELD

(75) Inventors: Oliver H. Lieder, Carson City, NV (US); Jack E. Howard, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/859,231

(22) Filed: Jun. 3, 2004

(65) Prior Publication Data

US 2005/0270041 A1 Dec. 8, 2005

(51) Int. Cl.
  *G01R 27/26* (2006.01)
(52) U.S. Cl. .................... 324/688; 324/658
(58) Field of Classification Search ........ 324/686–690, 324/658–663
See application file for complete search history.

(56) References Cited

U.S. PATENT DOCUMENTS

| | | | |
|---|---|---|---|
| 4,675,670 A | 6/1987 | Lalonde et al. ........ 340/870.37 |
| 5,012,196 A | 4/1991 | Baranski ..................... 324/662 |
| 5,070,302 A | 12/1991 | Marcus et al. .............. 324/662 |
| 5,363,051 A | 11/1994 | Jenstrom et al. ............ 324/661 |
| 5,513,539 A | 5/1996 | McLaughlin et al. ....... 73/865.9 |
| 5,539,292 A * | 7/1996 | Vranish .................. 318/568.21 |
| 5,539,323 A * | 7/1996 | Davis, Jr. .................... 324/690 |
| 5,563,344 A | 10/1996 | Kaiser et al. ............. 73/514.24 |
| 5,692,690 A * | 12/1997 | Gulledge et al. ......... 242/474.7 |
| 5,990,807 A | 11/1999 | Cloutier et al. ........ 340/870.37 |
| 6,075,464 A | 6/2000 | Cloutier et al. ........ 340/870.37 |
| 6,307,385 B1 | 10/2001 | Tardif et al. ................ 324/678 |
| 6,411,108 B1 * | 6/2002 | Douglas et al. ............. 324/658 |
| 6,552,667 B1 | 4/2003 | Missout et al. ........ 340/870.37 |
| 2003/0080755 A1 * | 5/2003 | Kobayashi ................. 324/658 |

OTHER PUBLICATIONS

International Search Report dated Aug. 12, 2005.

* cited by examiner

*Primary Examiner*—Anjan Deb
*Assistant Examiner*—Jeff Natalini
(74) *Attorney, Agent, or Firm*—Nixon & Vanderhye P.C.

(57) ABSTRACT

A non-contact capacitive sensor probe including a metallic sensor having a first surface opposite a dielectric medium to be sensed; a plurality of active metallic shields adjacent to the metallic sensor, each of the active metallic shields having a pattern of grooves inhibiting eddy currents on a surface of the shield, wherein the pattern on one shield does not overlap with the pattern on a second shield, and a passive metallic shield adjacent the active metallic shields, such that active metallic shields are sandwiched between the metallic sensor and the passive metallic shield.

26 Claims, 3 Drawing Sheets

NON-CONTACT CAPACITIVE SENSOR AND CABLE WITH DUAL LAYER ACTIVE SHIELD

BACKGROUND OF THE INVENTION

This invention relates to a method and system for non-contact measurement of a gap between a sensor and a conductive or non-conductive surface using a capacitive measurement device with a plurality of conductive plates that also permits measurement of gas, material depth and dielectric changes in solids and fluids.

Non-contact gap measurement sensors having two parallel superimposed conductive plates, which are electrically insulated from one another, are disclosed in, for example, U.S. Pat. Nos. 4,675,670; 5,990,807; 6,075,464 and 6,552,667. A high frequency signal is placed on the first plate (sense plate) of the sensor. By measuring the capacitive interaction between the sense plate and a proximate surface, the sensor generates a signal that is indicative of the gap or dielectric between the sensor and the surface.

An active guard plate is located behind the sense plate to prevent the sense signal from interacting with surfaces that lay behind the sense plate. Interaction between the sense signal and any surface except the desired proximate surface of interaction produces an error in the expected output. For the same reason it is also necessary to prevent the sense signal that is carried within the cable from interacting with any surfaces that are not at the same potential.

Non-contact capacitive sensors may be used in environments of high voltages and currents. For example, these sensors may be attached to a stator of a power generator to measure a gap between the stator and a rotor. Within the generator, the electromagnet field intensity may reach in excess of 15000 gauss. Under these conditions, strong eddy currents can form on the metal surfaces of a sensor probe. These eddy currents, if not curbed, may generate sufficient heat to damage the sensor probe and the generator.

To minimize eddy currents, it is well-known to laminate conductive materials of the generator such as the copper windings and the magnetic poles. Similarly, to minimize eddy currents on a conductive sheet as is used within a capacitive sensor, it is well-known to etch closely-spaced and parallel grooves on the metal surfaces. These grooves are often referred to as "combing" in that the grooves appear as the teeth of a hair comb. The grooves block eddy currents on a metal surface by forming dielectric gaps on the surface. The grooves may be filled with resin and fibers from the material, e.g., epoxy, used to bond the metal plates together in a sensor.

A difficulty is that the electric field signal on the sense plate passes through the combing grooves of the active guard to surfaces that lay behind the active guard. This leakage current through the guard plate may introduce a measurement error. In addition the sense signal carried on the center conductor of the coaxial cable connected to the sensor may pass through the braided coaxial active-guard layer because of the voids between the metallic strands of the cable.

Another difficulty created by the combing of the active guard on the sensor and the voids between the metallic conductors of the active-guard layer of the cable is that variations in the combing width and strands may cause inconsistent signal errors from sensor to sensor and cable to cable. The combing and strand variations arise from manufacturing variations.

There is a need for a capacitive measurement method and a non-contact capacitive measurement sensor that is less sensitive to variations in capacitance due to manufacturing variations in the sensor probe plates and cabling between the probe and a proximity circuit. Excessive sensitivity to these variations may increase the difficulty in manufacturing the sensor and increase the sensor sensitivity to temperature and other environmental factors.

BRIEF DESCRIPTION OF THE INVENTION

A non-contact capacitive probe has been developed to directly sense the capacitance of the probe relative to a surface or dielectric medium. The capacitive sensor probe has multiple active metallic shield plates that isolate a sense plate and prevent electrical signals from the sense plate from leaking to a ground or potential surface. The sense and active shield plates have grooved surfaces to minimize eddy currents. The grooves of one of the active shield plates is offset and not aligned with the grooves in the other shield plate. By offsetting the grooves in adjacent active shield plates, the leakage of the electric sense field through these plates is substantially reduced or eliminated.

The invention may be embodied as a non-contact capacitive sensor probe including a metallic sensor having a first surface opposite a dielectric medium to be sensed; a plurality of active metallic shields adjacent to the metallic sensor, each of the active metallic shields having a pattern of grooves inhibiting eddy currents on the surface of the shield, wherein the pattern on one shield does not overlap with the pattern on a second shield, and a passive metallic shield adjacent the active metallic shields, such that active metallic shields are sandwiched between the metallic sensor and the passive metallic shield.

The invention may also be embodied as a non-contact capacitive sensor probe comprising: a sensor plate adapted to be displaced from an opposite surface to measure a capacitance of a gap between the opposite surface and sensor plate; an active shield assembly adjacent and superimposed over said sensor plate and insulated from said sensor plate, wherein said active shield assembly further comprises a plurality of shield layers each separated from the other by a dielectric sheet; a ground shield plate over said active shield assembly so as to sandwich the active shield assembly between the ground shield plate and the sensor plate and said ground shield plate is separated from the active shield assembly by a dielectric sheet.

The invention may also be embodied as a non-contact capacitive sensor probe including a metallic sensor having a first surface opposite a dielectric medium to be sensed; a plurality of active metallic shields adjacent to the metallic sensor, each of the active metallic shields having a pattern of grooves inhibiting eddy currents on the surface of the shield, wherein the pattern on one shield does not overlap with the pattern on a second shield, and a passive metallic shield adjacent the active metallic shields, such that active metallic shields are sandwiched between the metallic sensor and the passive metallic shield, all of which is connected to an electrical circuit through a multilayer coaxial (triaxial) cable with the first (sense) surface of the probe connected to the center (inner most) conductor of the cable, the plurality of probe's active metallic shields connected to the coaxial (second) layer of the cable which is comprised of a continuous solid metallic layer having no voids and a stranded metallic layer, and the probe's passive metallic shield connected to the triaxial (third) layer of the cable.

The invention may be further embodied as a non-contact capacitive sensor probe including a metallic sensor having a first surface opposite a dielectric medium to be sensed; a plurality of active metallic shields adjacent to the metallic sensor, each of the active metallic shields having a pattern of grooves inhibiting eddy currents on the surface of the shield, wherein the pattern on one shield does not overlap with the pattern on a second shield, all of which is connected to an electrical circuit through a coaxial cable with the first (sense) surface of the probe connected to the center (inner most) conductor of the cable, the plurality of probe's active metallic shields connected to the coaxial (second) layer of the cable which is comprised of a continuous solid metallic layer having no voids and a stranded metallic layer.

BRIEF DESCRIPTION OF THE DRAWINGS

FIG. 2 is an enlarged view of an end section of the sensor and a surface shown in FIG. 1.

DETAILED DESCRIPTION OF THE INVENTION

Figure 2:
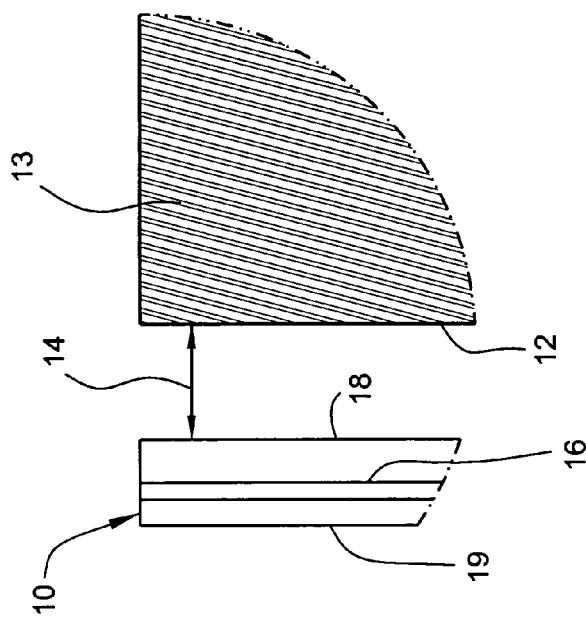
FIGS. 1 and 2 are schematic diagrams of a non-contacting capacitive sensor.
Figure 1:
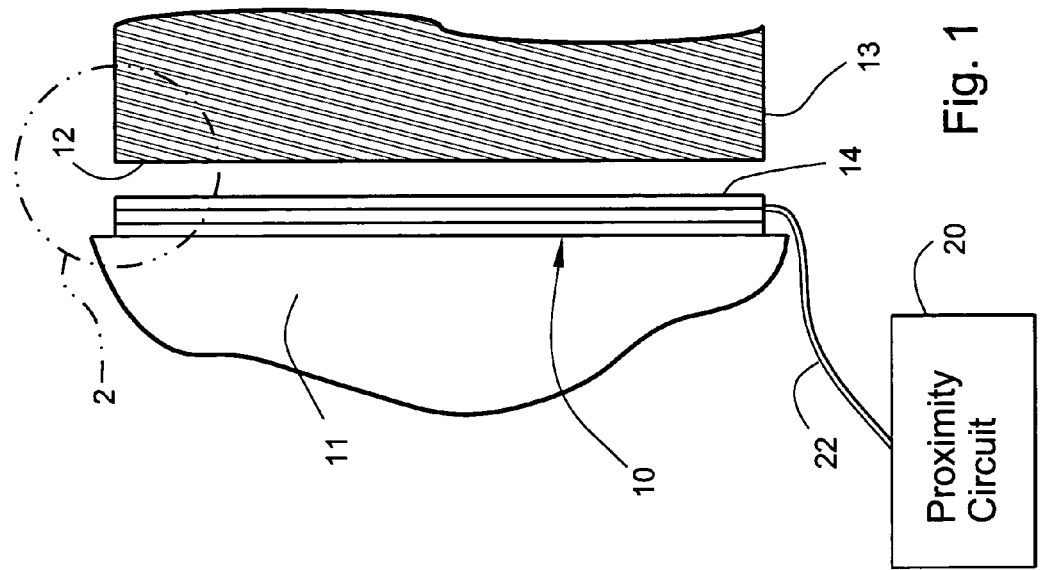

FIGS. 1 and 2 show schematically a sensor plate probe 10 adjacent an opposite surface 12 and a gap 14 between the sensor and the opposite surface. In one example, the plate probe 10 may be permanently fixed to an inside surface of a stator 11 of a power generator and the opposite surface 12 may be the outer circumference of a rotor of the generator. In this example, the sensor plate probe 10 measures the gap 14 distance between the annular inside stator surface and the cylindrical outer surface of the spinning rotor.

The sensor probe 10 generates a signal indicative of the distance of the gap 14 or of a proportionality of a dielectric medium in front of the sensor. In addition to measuring a distance of a gap, the sensor probe may determine a change in a dielectric of a fluid flowing in front of the sensor, or the thickness of a material.

The sensor probe 10 comprises several adjacent conductive plates 16, 18 and 19 that are electrically isolated from each other. The active shield plate assembly 16 shields the sensor plate 18 from electrical disturbances on surfaces behind the sensor 10 and from the passive shield plate 19. The sensor plate 18 faces the rotor surface 12 and the gap 14. The sensor plate is used to measure the capacitance across the gap and is oriented parallel to the rotor surface. The active shield plate assembly and passive plate are stacked with the sensor plate and laminated together to form the plate sensor 10.

The active shield plate assembly 16 is immediately behind the sensor plate 18 and actively shields the sensor plate by being connected as an input to a proximity circuit 20. An electrical cable 22 connects the sensor plate 18 and active shield plate assembly 16 to the proximity circuit.

The active shield plate assembly 16 is comprised of dual active internal conductive parallel plates 24 and 26 with offset combing patterns. The active plate assembly 16 is behind the active sense plate 18 of the capacitive sensor probe 10 to prevent the sense plate from observing the passive ground layer of the sensor or other potential surfaces that may be located behind the sensor probe 10. In addition, the active shielding plates 16 are connected to a coaxial layer of a triaxial cable 22 that is also connected to the proximity circuit 20.

The proximity circuit 20 amplifies the capacitive interaction between sense plate 18 and conductive medium 12. The signal of the active shield 16 is at the same potential as the sense plate 18 thus having no electric field interaction or capacitance. An exemplary proximity sensor is disclosed in commonly owned and co-pending U.S. patent application Ser. No. 10/825,185 and entitled "A Capacitive Sensor And Method For Non-Contacting Gap And Dielectric Medium Measurement", the entirety of which is incorporated by reference.

In addition to measuring a gap displacement, the sensor probe 10 may also be applied to measure a depth of a fluid and the thickness of a material. The signal from the sensor plate 18 is influenced by the dielectric of the adjacent medium in the gap. The adjacent medium may be an air gap between the sensor plate and another surface 12, a fluid across the sensor plate or a solid material abutting the sensor plate. The dielectric of the adjacent medium affects the capacitance of the gap which directly affects the signal from the sensor plate.

The dielectric of the medium adjacent the sensor plate 18 may be indicative of: a depth of or impurities in a fluid, where the fluid is the medium, or the thickness of or impurities in a solid, where the solid is the medium. Accordingly, the sensor probe may be used to measure the depth of a fluid, the thickness of a solid medium or impurities in a medium adjacent the sensor plate.

The passive shield plate 19 provides additional shielding from surfaces behind the sensor and provides a ground reference for the probe. The passive shield plate 19 may be connected to the active shield plate assembly 18 through a resistor in the proximity circuit 20 to provide a dc current path that allows the proximity circuit to detect an open or short in the probe 10 and the connecting cable 22.

Figure 3:
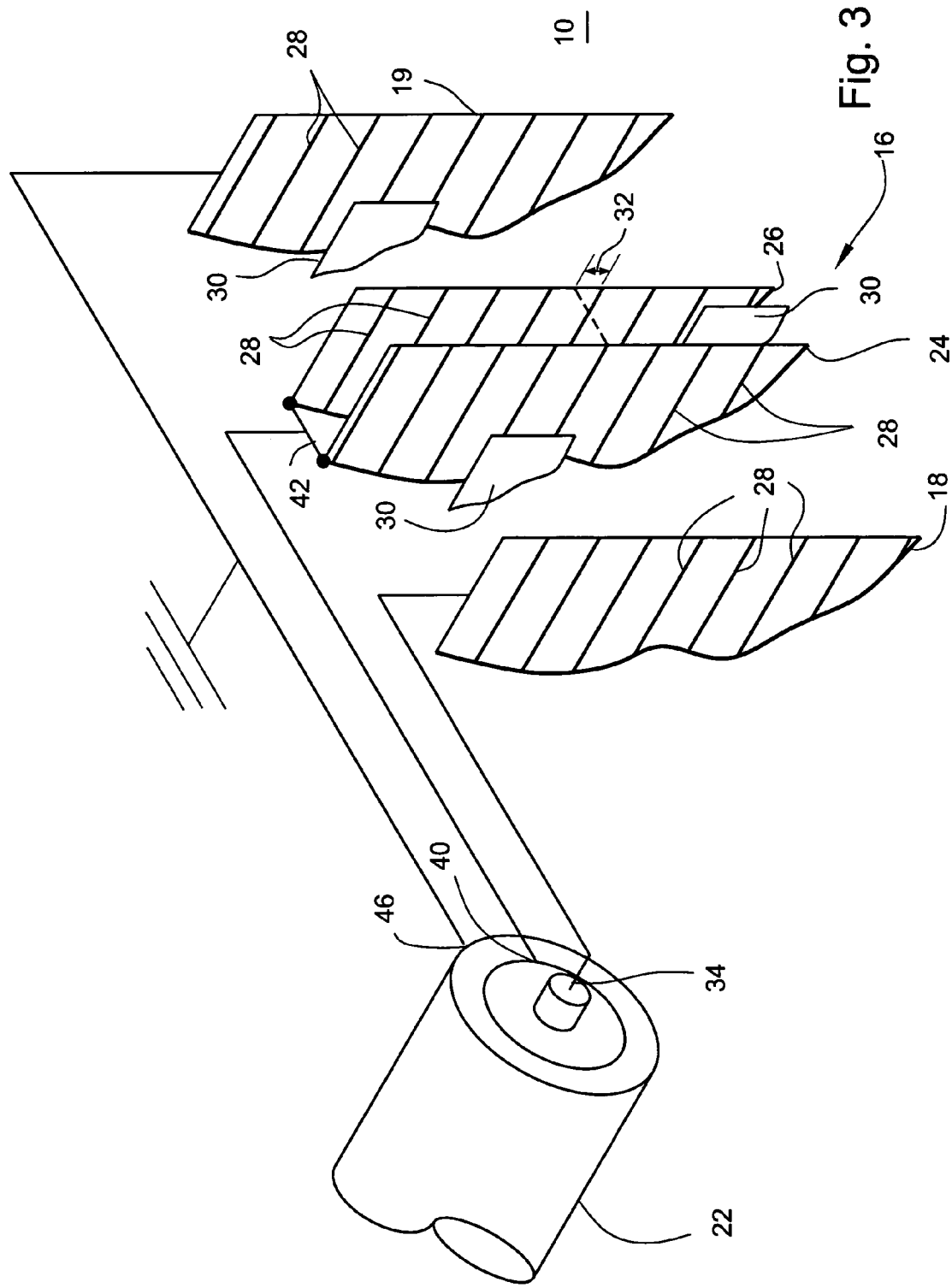
FIG. 3 is an exploded view of the plates and layers of the sensor probe.

FIG. 3 is an exploded view of the sensor probe 10. The exploded view shows the plates separated for illustrative purposes. In practice, the plates are bonded together by a resin, e.g., epoxy, such that the plates are laminated together. The plates may be copper or other metallic material.

The plates may be etched with closely spaced grooves 28, e.g., combing, to minimize eddy currents on the plates. The plates of the sensor probe have grooves 28 in a comb arrangement referred to as comb lines. The groove spacing may be 1/10 to 1/4 of an inch apart and approximately four mils (100 micrometers) wide for use in generator electromagnetic fields of 50 Hz to 60 Hz at 15000 gauss. Eddy currents on the surface of the plates do not flow over the grooves, which act as dielectric barriers to eddy currents. Moreover, the grooves may be formed by methods other than etching, such as by machining grooves in the plate surfaces, embossing and other methods to create parallel groove lines on the plate that block eddy currents.

The active shield plate assembly includes a pair of adjacent shield plates 24, 26 that sandwich a thin fiber glass fiber sheet 30 that separates and isolates the plates 24, 26 from each other. Similar fiber sheets 30 may separate the senor plate 18 from the active plate assembly and the passive plate 19 from the active plate assembly. A fiber sheet 30 may be 5 mils (125 microns) thick. The copper plates in the probe 10, the insulating fiber sheets and the resin that bonds the plates and sheets together may be conventional materials commonly used in the manufacturer of printed circuit boards.

The plates of the active shield plate assembly are stacked such that the combing grooves do not overlap. The grooves on one plate may be parallel to the grooves of the other plate. To avoid overlapping the grooves in one plate 26 are offset 32 from the etched lines in the other plate 24. The offset 32 is illustrated in FIG. 3 by arrows on plate 26 and a lead line from an etched line of the adjacent plates 24. The offset 32 ensures that the grooves of one plate 24 do not directly overlie the etched lines of the other plate 26. The second plate 26 and the offset 32 of etched lines prevent electric field currents that would otherwise leak through the first active shield plate 24 from finding a potential surface or ground. Without the offset, there is a potential that current leaking through the grooves of the first plate 24 will flow directly into an overlapping groove on and through the second plate 26. Accordingly, the two active shield plates and the offset in their grooves ensures that the electric potential on the sense plate does not leak through the active shield plate assembly.

Figure 4:
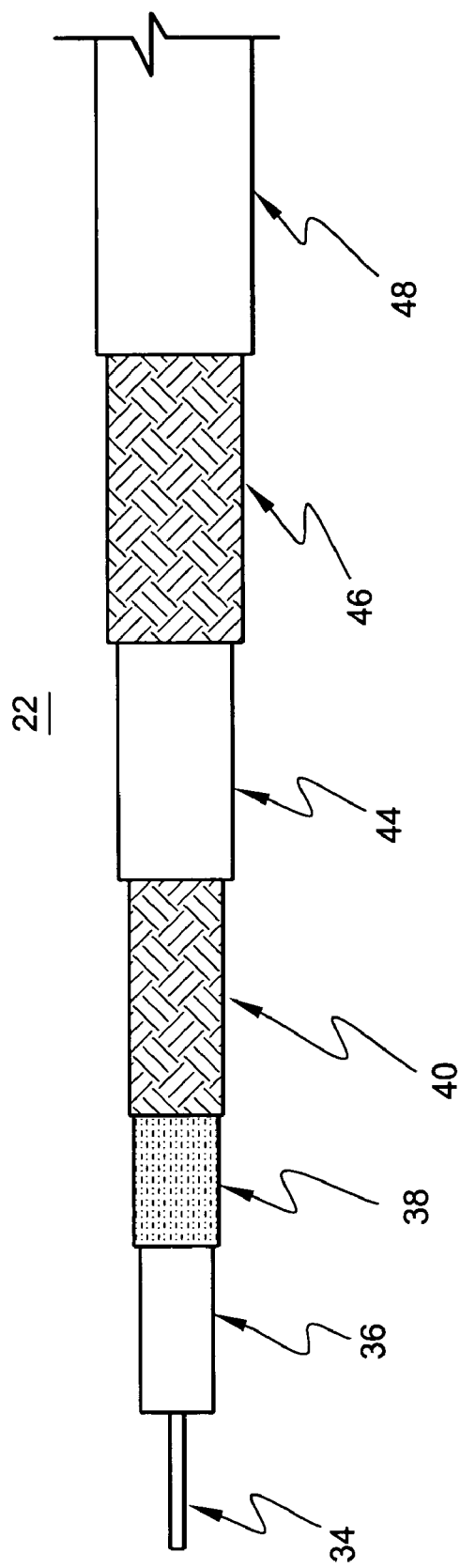
FIG. 4 is a side view of a sensor cable, with its various conductive and dielectric layers exposed.

FIG. 4 is a side view of the conductor cable 22 that connects the sensor probe 10 to the proximity circuit 20. The cable may be embodied as a triaxial cable having an axial-center sensor signal conductor wire 34 and coaxial shielding conductive layers 38, 40, 46. The signal conductor 34 may be soldered to an edge of the sensor plate 18. The conductor 34 connects the sensor plate to an input of the proximity circuit. The conductor cable has a first dielectric coaxial layer 36 separating the signal conductor 34 from active shield layers 38, 40 of the cable.

The coaxial layer incorporates a metallic foil layer 38 that provides a non-porous continuous metallic coverage of the center signal conductor 34 to prevent the signal on the center conductor from leaking to the outer triaxial layer 46 of the cable or to ground.

The continuous coaxial aluminum foil layer 38 surrounds the signal conductor 34, electrically isolates the conductor from outside electrical disturbances and prevents current leakage from the signal conductor. The foil layer 38 is surrounded and in electrical contact with a braided coaxial wire layer 40 that provides structural strength and low electrical resistance for the foil layer. The end of the wire layer 40 may be soldered to the edges 42 of the pair of active shield plates 24, 26. The active shield plate assembly 16 is electrically coupled to the active shield layers 38, 40 in the cable 22.

A second coaxial dielectric layer 44 isolates the active shield layers 38, 40 from a third conductive coaxial layer 46 formed of braided wire. The third layer 46 may be electrically coupled to the passive layer 19 of the sensor probe such that the probe, cable and proximity sensor all have a uniform ground electrical level. An outer coaxial sheath 48 provides a casing for the enclosed layers of the cable 22.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A non-contact capacitive sensor probe comprising:
   a metallic sensor having a first surface opposite a dielectric medium to be sensed;
   a plurality of active metallic shields adjacent to the metallic sensor, each of said active metallic shields having a pattern of grooves inhibiting eddy currents on a surface of the shield, wherein the pattern on a first of said shields is non-overlapping with the pattern on a second of said shields, and
   a passive metallic shield adjacent the active metallic shields, such that active metallic shields are sandwiched between the metallic sensor and the passive metallic shield.

2. The non-contact capacitive sensor probe of claim 1 wherein the active shields are separated by a dielectric sheet.

3. The non-contact capacitive sensor probe of claim 1 wherein the sensor is a metallic plate and the active metallic shields are a plurality of metallic plates.

4. The non-contact capacitive sensor probe of claim 1 wherein the pattern of grooves on each of the active metallic shields are a pattern of parallel lines.

5. The non-contact capacitive sensor probe of claim 1 wherein the pattern of grooves are line grooves each having a spacing $\frac{1}{10}$th inch to $\frac{1}{4}$ inch apart.

6. The non-contact capacitive sensor probe of claim 1 wherein the pattern of grooves are line grooves having a width of approximately 4 mils.

7. The non-contact capacitive sensor probe of claim 1 wherein the pattern of grooves on each of the active metallic shields are a pattern of parallel lines, and wherein the pattern of parallel lines on the first shield is offset with respect to the pattern of parallel lines on the second shield.

8. The non-contact capacitive sensor probe of claim 1 wherein said first and second shields are superimposed one over another and which sandwich a dielectric sheet between them.

9. The non-contact capacitive sensor probe of claim 1 further comprising a coaxial cable having a center conductor electrically connectable to the sensor, and a coaxial metallic active shield around the conductor and electrically connectable to the active metallic shields of the sensor probe.

10. The non-contact capacitive sensor probe of claim 9 wherein the coaxial metallic active shield further comprises a continuous foil layer arranged cylindrically around the conductor and a braided wire tube adjacent the foil layer.

11. A non-contact capacitive sensor probe comprising:
    a sensor plate adapted to be displaced from an opposite surface to measure a capacitance of a gap between the opposite surface and sensor plate;
    an active shield assembly adjacent and superimposed over said sensor plate and insulated from said sensor plate, wherein said active shield assembly further comprises a plurality of shield layers each separated from the other by a dielectric sheet;
    a ground shield plate over said active shield assembly so as to sandwich the active shield assembly between the ground shield plate and the sensor plate and said ground shield plate is separated from the active shield assembly by a dielectric sheet.

12. The non-contact capacitive sensor of claim 11 wherein said plates are superimposed one over another.

13. The non-contact capacitive sensor of claim 11 wherein said plates are laminated together with insulation between each plate.

14. The non-contact capacitive sensor of claim 11 further comprising a non-capacitive interaction between the active shield assembly and sensor plate, and a capacitance between the active shield assembly and the ground shield plate.

15. The non-contact capacitive sensor of claim 11 wherein said sensor plate has a planar surface facing the opposite surface.

16. The non-contact capacitive sensor of claim 11 wherein the sensor plate and active shield plates further comprise connections to a proximity sensor circuit.

17. The non-contact capacitive sensor probe of claim 11 wherein each of the shield layers have a pattern of grooves to inhibit eddy currents, and said pattern of grooves on a first shield layer is offset from the pattern of grooves on a second shield layer.

18. The non-contact capacitive sensor probe of claim 17 wherein the pattern of grooves on each of the active metallic shields are a pattern of parallel lines.

19. The non-contact capacitive sensor probe of claim 17 wherein the pattern of grooves are line grooves each having a spacing of 1/10th inch to 1/4 inch.

20. The non-contact capacitive sensor probe of claim 17 wherein the pattern of grooves are line grooves having a width of approximately 4 mils.

21. The non-contact capacitive sensor probe of claim 17 wherein the pattern of grooves on each of the active metallic shields are a pattern of parallel lines, and wherein the pattern of parallel lines on the first shield is offset with respect to the pattern of parallel lines on the second shield.

22. The non-contact capacitive sensor probe of claim 17 wherein said first and second shields are superimposed one over another and which sandwich a dielectric sheet between them.

23. The non-contact capacitive sensor probe of claim 17 further comprising a coaxial cable having a center conductor electrically connectable to the sensor, and a coaxial metallic active shield around the conductor and electrically connectable to the active metallic shields of the sensor probe.

24. A non-contact capacitive sensor probe comprising:
a sensor plate adapted to be displaced from an opposite surface to measure a capacitance of a gap between the opposite surface and sensor plate;
an active shield assembly adjacent and superimposed over said sensor plate and insulated from said sensor plate, wherein said active shield assembly further comprises a plurality of shield layers each separated from the other by a dielectric sheet;
a passive shield over said active shield assembly and sandwiching the active shield assembly between passive shield and the sensor plate, wherein said passive shield is separated from the active shield assembly by a dielectric sheet.

25. A non-contact capacitive sensor probe comprising:
a metallic sensor having a first surface opposite a dielectric medium to be sensed;
a plurality of active metallic shields adjacent to the metallic sensor, each of the active metallic shields having a pattern of grooves inhibiting eddy currents on the surface of the shield, wherein the pattern on one shield is offset from the pattern on a second shield;
a passive metallic shield adjacent the active metallic shields, such that the active metallic shields are sandwiched between the metallic sensor and the passive metallic shield;
a multilayer coaxial cable further comprising:
a center conductor connected to the sense surface of the probe;
a first conductive coaxial layer connected to active metallic shields of the probe, wherein said first conductive coaxial layer is comprised of a continuous solid metallic layer and a second metallic layer including metal wire strands, and
a third conductive coaxial layer connected to the passive metallic shield of the probe.

26. A non-contact capacitive sensor probe including a metallic sensor comprising:
a first surface opposite a dielectric medium to be sensed;
a plurality of active metallic shields adjacent to the metallic sensor, each of the active metallic shields having a pattern of grooves inhibiting eddy currents on the surface of the shield, wherein the pattern on one shield is non-overlapping with the pattern on a second shield;
a coaxial cable further comprising:
a center conductive connector connectable to the first surface of the metallic sensor, and
a first coaxial layer connectable to the active metallic shields of the probe and further comprising a continuous solid metallic layer having no voids and a second metallic layer including metal wire strands.

* * * * *